United States Patent [19]

Arvesen

[11] Patent Number: 4,704,235

[45] Date of Patent: Nov. 3, 1987

[54] DECONTAMINATION OF PRESSURIZED WATER REACTORS

[75] Inventor: Jan Arvesen, Nyköping, Sweden

[73] Assignee: Studsvik Energiteknik AB, Nyköping, Sweden

[21] Appl. No.: 789,958

[22] PCT Filed: Feb. 5, 1985

[86] PCT No.: PCT/SE85/00052

§ 371 Date: Oct. 4, 1985

§ 102(e) Date: Oct. 4, 1985

[87] PCT Pub. No.: WO85/04279

PCT Pub. Date: Sep. 26, 1985

[30] Foreign Application Priority Data

Mar. 9, 1984 [SE] Sweden ........................ 8401336

[51] Int. Cl.$^4$ .................... G21F 9/00; C02F 5/08; C23G 1/02

[52] U.S. Cl. .................................. 252/626; 134/2; 134/3; 134/28; 134/29; 134/41; 210/682; 210/684; 210/760; 252/80; 376/306; 376/310

[58] Field of Search .............. 252/626, 627, 631, 80; 376/310, 306, 308, 309; 210/760, 682, 684; 422/186.08; 204/176; 134/2, 3, 10, 13, 28, 29-30, 36, 41

[56] References Cited

U.S. PATENT DOCUMENTS

| | | | |
|---|---|---|---|
| 3,803,295 | 4/1974 | Cathers et al. | 252/631 |
| 3,873,362 | 3/1975 | Mihram et al. | 134/3 |
| 4,162,229 | 7/1979 | Loewenschuss | 252/626 |
| 4,172,786 | 10/1979 | Humphrey et al. | 210/760 |
| 4,287,002 | 9/1981 | Torok | 134/3 |
| 4,437,999 | 3/1984 | Mayne | 210/760 |

FOREIGN PATENT DOCUMENTS

| | | |
|---|---|---|
| 0134664 | 3/1985 | European Pat. Off. . |
| WO84/03170 | 8/1984 | PCT Int'l Appl. . |
| 80018278 | 8/1984 | Sweden . |

*Primary Examiner*—John F. Terapane
*Assistant Examiner*—Howard J. Locker
*Attorney, Agent, or Firm*—Burns, Doane, Swecker & Mathis

[57] ABSTRACT

A method of decontaminating radionuclide-contaminated acid insoluble corrosion products from primary system surfaces in pressurized water reactors by oxidation and concurrent dissolution in an acidic decontamination solution of the corrosion products which have been made acid-soluble by the oxidation. The characterizing feature of the method is that the oxidation is carried out at relatively low temperatures with a water-based oxidation agent having a pH below 7 and containing cerium nitrate, chromic acid and ozone.

30 Claims, No Drawings

DECONTAMINATION OF PRESSURIZED WATER REACTORS

TECHNICAL FIELD

The present invention relates to a method by which radio active coatings on the walls of the primary heating system in nuclear reactors of the pressurized water type can be removed. More specifically, the invention relates to the decontamination of in acid insoluble or sparingly soluble corrosion products from these primary system surfaces. In this respect the invention is a development and simplification of the technique that includes a first step wherein the contaminated surfaces are contacted with an oxidation agent, for oxidation of the insoluble products to acid-soluble oxidation products, whereupon in a subsequent step the oxidized products are dissolved and removed by means of an acidic decontamination solution.

BACKGROUND ART OF THE INVENTION

Corrosion products stemming from the primary heating system, which to a major extent comprises the tubes and pipe-lines of the steam generators, are conveyed into the reactor core where they are deposited on the fuel elements.

After some time, the corrosion products, which are now radioactive after the neutron irradiation, are liberated from the fuel elements and are subsequently deposited on the parts of the primary system in contact with water which lie outside the reactor core. Then the radioactive corrosion products give rise to radiation fields outside the core and thereby to radiation doses to the operational personnel.

Another cause of the occurrence of radiation fields is fuel element leakage. In case of leakage in the encapsulating material of the fuel elements fission products are leached out by the circulating water. These products are then incorporated in the oxide layers on the parts of the system (primarily the steam generators) lying outside the reactor core.

The radiation doses received by personnel must be kept within prescribed limits. For reasons of health and operational economy, the doses should of course be kept as low as is reasonably possible.

Before undertaking major work on the primary system, it can thus be desirable to remove the radioactive corrosion and fission products which have been deposited on the primary system surfaces. By a partial or complete dissolution of the oxide layers, a substantial portion of the radioactive isotopes can be removed from the system surfaces. In nuclear reactor terminology this process is denoted decontamination. Most of the known processes within this technology have been described in detail in J. A. Ayres, Ed., Decontamination of Nuclear Reactors and Equipment, the Ronal Press Company, N.Y. (1970).

During the years from about 1961 and up to the first years of the seventies, only a very small number of decontaminations of reactor systems were carried out. The most discussed decontaminations during this period were those of the Shippingport PWR (PWR=Pressurized Water Reactor) in the USA and the PWR plant at Greifswald in the GDR. Modified versions of the APAC method developed during 1961 in the USA were used in these decontaminations.

There were two steps in this method, namely a first oxidizing step with alkaline permanganate followed by a second dissolving step with an acidic decontamination solution containing ammonium citrate.

Common to all modifications of the APAC process is that the contents of chemicals must be relatively high for acceptable decontamination factors to be achieved. The decontamination factor (Df) is defined in the following way:

$$Df = \frac{\text{radiation field before decontamination}}{\text{radiation field after decontamination}}$$

In occasional cases where the APAC process has been used, it has been necessary to repeat the decontamination a number of times to obtain a satisfactory result.

The radioactive solutions of chemicals from this process have either been purified by ion exchangers or been treated in special evaporators. The greatest disadvantage with the APAC process is the large volumes of waste occurring in the form of radioactive ion exchange masses or evaporator residues.

The above-mentioned disadvantages have resulted in that during 1970 work was started in several quarters on developing new processes. The aim then was to achieve processes which:

provide an acceptable decrease of the radiation fields during a treatment time of maximum 36 hours, only require low concentrations of chemicals in the final step by the utilization of continuous regeneration of the chemicals with cation exchange, are possible to perform at temperatures below 100° C., give a final waste in the form of ion exchange masses containing all chemicals present, including metals and radio isotopes released or liberated during the process.

As to the processes which began to be developed during the seventies and which are used today, it has been found necessary to include a pre-treatment step with oxidizing reactants.

In said pre-treatment step essentially the following oxidizing agents are used:

permanganate in an alkaline or nitric acidic environment (in the latter case the pH is about 2.5)

potassium hexacyanoferrate in an alkaline environment.

In the subsequent treatment step there are used almost exclusively organic acids (citric or oxalic acids and ammonium salts of these) and some strong complex forming agent, e.g. EDTA (ethylenediaminetetraacetic acid). Additives in the form of reducing agents such as aldehydes or ascorbic acid can also be present in the acid treatment step.

The conditions (reducing, high pH) prevailing in a pressurized water reactor are such that the oxide layers formed will to a large extent have relatively high contents of chromium, partially together with nickel, in the form of oxide or spinel phases. To have these oxide layers dissolved at all in organic acids, it is thus necessary to carry out the pre-treatment in an oxidizing environment. At present the completely dominating oxidation agent in this respect is permanganate. The reaction sequence for the oxidation step is substantially as follows:

$$3MnO^{-}_4 + Cr^{3+} + 8H_2O \rightleftarrows 3Mn^{2+} + 5CrO_4^{2-} + 16H^{+}$$

In order to illustrate more in detail the decontamination effect, which may be obtained by the processes available today, reference is made to the following.

In all processes available today in Europe, USA and Canada there are at least two treatment steps, one of which is always the above-mentioned pre-oxidation step. All these processes have been tested, partly on a laboratory scale, partly at half or full scale in some cases. The processes worked out in Europe have been tested in two international decontamination projects. These are the Agesta decontamination project in process in Sweden, and the project in process at the Pacific National Laboratories, Richland, Wash., USA. The tests in the USA have been carried out in an authentic steam generator taken from the Surry-II PWR plant after an approximate operation time of 6 years. In the Agesta project, laboratory tests have been carried out on samples taken from the steam generators in Ringhals-2 (Sweden), Biblis A (Germany), Millstone 2 (USA) and from the inlet chamber in one of the steam generators in the Borssele reactor in Holland.

The Swedish laboratory tests have been carried out with so-called "soft" processes (i.e. processes where low contents of chemicals are used) developed at:

Studsvik Energiteknik AB (Sweden)
Kraftwerk Union (Germany)
EIR (Switzerland)
BNL (CEGB) (England)

The samples from the above-mentioned PWR:s were of the following materials:

| | |
|---|---|
| Ringhals-2 | Inconel 600 |
| Millstone-2 | Inconel 600 |
| Bibl1s A | Incoloy 800 |
| Borssele | AISI 304. |

In this connection it may be mentioned that the compositions of these materials in percent per weight are:

| Material | C | Si | Mn | Cr | Ni | Mo | Fe |
|---|---|---|---|---|---|---|---|
| AISI 304 | 0.04 | 0.4 | 1.2 | 19 | 9.5 | 0.2 | residue |
| Incoloy 800 | 0.02 | 0.6 | 0.6 | 21 | 33 | | residue |
| Inconel 600 | 0.02 | 0.3 | 0.8 | 16 | 73 | | residue |

The results of these tests can be summarized as follows:

The samples of Inconel 600 were difficult to decontaminate. Decontamination factors exceeding 3 (the lowest acceptable value) could only just be achieved by three of the four processes.

The samples of Incoloy 800 and AISI 304 reached satisfactory decontamination factors by a good margin.

In the tests in the steam generator from Surry-II PWR, a process was tested which had been developed in Canada as well as a process similar to the one tested by BNL (CEGB) in the Agesta project.

The results of the tests showed here as well that surfaces of Inconel 600 were very difficult to decontaminate. Acceptable decontamination factors could be achieved only after several treatment cycles. It should be noted in this connection that a pre-oxidation step with permanganate is included in both these processes.

As prior art in this area, even if this art is not utilized in practice today, the art disclosed in the Swedish Patent Application Ser. No. 8001827-8 (based on U.S. Ser. No. 028,200 filed on Apr. 9, 1979) now U.S. Pat. No. 4,287,002, may also be mentioned. Said patent application describes a decontamination method where the pre-oxidation step is carried out by means of ozone as the oxidation agent. In the subsequent acid dissolving step organic acids and complex forming agents are used at high temperatures such as 85° C. and 125° C. In the patent application there are described decontamination trials on samples pre-oxidized for 7 days (PWR environment at 350° C.) and thereafter exposed for 3 months at 250° C. in a PWR trial plant. In the trials, decontamination factors with a mean of about 2.7 were obtained for samples of Inconel 600, which must be regarded as a low value.

DISCLOSURE OF THE INVENTION

In accordance with the present invention it has surprisingly been found possible to substantially eliminate the disadvantages of the previously known art, above all large amounts of secondary wastes, low decontamination factors, high contents of chemicals and high treatment temperatures, which in turn lead to increased corrosions and high costs, etc. The method according to the invention which is preferably performed in one step only, more specifically involves the utilization in an acidic, preferably nitric acidic, aqueous solution of the combination of cerium(4)nitrate, chromic acid and ozone. Thus, surprisingly this combination has been found to give a synergistic effect which could not be predicted against the background of the known properties of these oxidation agents taken individually.

In the method according to the invention, the contaminated surfaces are brought into contact with the above-mentioned oxidation agent in an aqueously based form and with an acidic pH, i.e. a pH below 7. This may mean, for example, that the oxidation agent is present in the form of an aqueous solution of cerium nitrate and chromic acid, and ozone preferably in a saturated solution and dispersed form. In accordance with another embodiment of the method the oxidation agent can however be utilized in the form of a two-phase ozone gas-water mixture, where ozone in gaseous form is dispersed in water with added cerium nitrate and chromic acid. This in turn means that the ozone addition per se can take place substantially in accordance with the same principles as in the Swedish Patent Application Ser. No. 8001827-8, which therefore do not need to be repeated here.

In addition to the above-mentioned advantages with the invention in relation to the prior art, it has furthermore been found, surprisingly, to be possible to achieve the favourable results at room temperature already, and while using low proportions of the chemicals utilized. This signifies, of course, an extremely vital contribution to the art in the area, since it is thus possible to save costs thanks to the use of smaller amounts of chemicals, thanks to savings in energy and thanks to reduced corrosions. A particularly preferable embodiment of the method in accordance with the invention thus means that the decontamination is carried out at room temperature or lower, i.e. at a temperature below about 25° C. and preferably below 20° C. However, very favourable effects in relation to the known art are obtained in the decontamination already at a temperature below about 60° C.

The decontamination according to the invention means that the contaminated surfaces are contacted with the acidic solution with the new oxidation agent for a period of time sufficient to oxidize insoluble oxides, so as to make these soluble in the same solution. The period of time required in each individual case is of course easily determined by one skilled in the art against the background of utilized concentrations of oxidation reagents, utilized treatment temperatures etc.

A water-soluble cerium salt has oxidizing properties only when the cerium ion is present in its highest oxidation stage, viz. $Ce^{4+}$, while the pH of the solution is preferably about 1. When selecting the cerium salt Ce(3)nitrate is preferably used which in contact with the ozone is immediately oxidized in Ce(4)nitrate.

The origin of the chromic acid is preferably dosed chromium trioxide, and the ozone is suitably utilized in the form of an ozone-enriched oxygen gas or air.

The concentrations or proportions of the chemicals included in the oxidation agent are determined by one skilled in the art from case to case, so as to obtain the desired results, inter alia depending on the materials which are to be decontaminated and the desired decontamination effect, but generally the concentrations are usually within the range of 0.01–50 g/l, preferably 0.5–2 g/l, of cerium nitrate, within the range of 0.01–50 g/l, preferably 0.05–0.2 g/l, of the chromic acid and within the range of 0.001–1 g/l, preferably 0.005–0.015 g/l of the ozone.

The water-based or aqueous oxidation agent has preferably been made acidic by nitric acid, preferably to a pH of about 1.

The method in accordance with the invention is generally utilizable for the decontamination of all those different types of material which are present in these connections. However, the invention has been found to give extremely good results in the decontamination of chromium (III) oxide from a chromium-nickel-iron alloy, such a decontamination therefore representing an especially preferable embodiment of the invention.

The invention will now be described in conjunction with some non-limiting examples.

EXAMPLES

In a number of decontamination tests carried out on samples of Inconel 600 taken from a number of different positions of steam generator in a PWR after an operation time of about 8 years, which samples were the most difficultly decontaminable ones to be obtained, the samples were treated at room temperature (about 20° C.) for 48 hours in an oxidizing solution in accordance with the invention. This solution consisted of an aqueous solution, made acidic to pH 1.4 with nitric acid, of 1.5 g/l of cerium(3)nitrate, 0.1 g/l of chromic acid and 12 g/l of boric acid to which ozone was continuously supplied.

The decontamination factors obtained at these experiments were 20–300.

In comparative tests carried out on similar samples, i.e. tubes of Inconel 600, with the most effective of the soft processes tested at the Agesta and Surry-II projects, both requiring an operational temperature of 80°–90° C., decontamination factors with an average of merely 6.2 were obtained.

In addition to the decontamination tests reported above, corrosion tests have been carried out on blank, non-preoxidized samples of Inconel 600. The test pieces were 3 pieces of steam generator tubes with lengths of 5 cm. To simulate the condition in the rolled zone in the tubes of the tube plate these samples had been rolled internally to half the lengths thereof. The cold deformation obtained was about 5%.

The three samples were exposed in parallel in a 100 ml glass container in an aqueous solution containing 12 g/l of boric acid, 1.5 g/l of Ce(3)nitrate and 0.1 g/l of $CrO_3$ in nitric acid at a pH of about 1.4. Oxygen gas with about 2.5 percent by volume of ozone was bubbled into the same container at a rate of about 0.1 l/min.

The temperature was 20° C. and the exposure time was 48 hours.

The weight losses during this exposure are accounted for in the Table below.

A further exposure cycle, identical with the first one was carried out. The weight losses at this exposure are also presented in the Table. The material loss after each exposure cycle is on an average well below 1 μm, which must be regarded as extremely satisfactory. No signs of local corrosion have been observed.

TABLE

Corrosion tests carried out on 3 identical rolled tube samples of Inconel 600 exposed in parallel to each other.

| Cycle | Exposure times: Time hours |
|---|---|
| 1a | 48 |
| 1b | 48 |

| Tube sample No. | Material loss (μm) Cycle 1 | Cycle 2 |
|---|---|---|
| 0 | 0.86 | 0.68 |
| 1 | 0.91 | 0.58 |
| 2 | 0.98 | 1.11 |

What is claimed is:

1. A method of decontaminating radionuclide-contaminated acid-insoluble corrosion products from primary system surfaces in pressurized water reactors comprising contacting the contaminated surfaces with an oxidation agent in an acidic solution and dissolving the corrosion products which have been made acid-soluble by the oxidation, the oxidation being performed with a water-based oxidation agent having a pH below 7 and containing 0.01–50 g/l cerium nitrate, 0.01–50 g/l chromic acid and 0.001–1 g/l ozone.

2. A method according to claim 1 wherein the oxidation agent is an acidic aqueous solution of cerium nitrate and chromic acid and ozone in a saturated solution and dispersed form.

3. A method according to claim 1 wherein the oxidation agent is a two-phase ozone gas-aqueous mixture, where ozone in gaseous form has been dispersed in an acidic aqueous solution of cerium nitrate and chromic acid.

4. A method according to claim 1 wherein the oxidation and dissolution are performed in one and the same step.

5. A method according to claim 1 wherein the oxidation and dissolution are carried out at a temperature below about 60° C.

6. A method according to claim 1 wherein the water-based oxidation agent has been made acidic with nitric acid.

7. A method according to claim 6 wherein the water-based oxidation agent has been made acidic to a pH value of about 1.

8. A method according to claim 1 wherein the concentration of cerium nitrate is 0.5–2 g/l, the concentration of chromic acid is 0.05–0.2 g/l, and the concentration of the ozone is 0.005–0.015 g/l.

9. A method according to claim 2 wherein the oxidation and dissolution are performed in one and the same step.

10. A method according to claim 3 wherein the oxidation and dissolution are performed in one and the same step.

11. A method according to claim 2 wherein the oxidation and dissolution are carried out at a temperature below about 60° C.

12. A method according to claim 3 wherein the oxidation and dissolution are carried out at a temperature below about 60° C.

13. A method according to claim 4 wherein the oxidation and dissolution are carried out at a temperature below about 60° C.

14. A method according to claim 9 wherein the oxidation and dissolution are carried out at a temperature below about 60° C.

15. A method according to claim 2 wherein the water-based oxidation agent has been made acidic with nitric acid.

16. A method according to claim 3 wherein the water-based oxidation agent has been made acidic with nitric acid.

17. A method according to claim 4 wherein the water-based oxidation agent has been made acidic with nitric acid.

18. A method according to claim 2 wherein the concentration of cerium nitrate is 0.5–2 g/l, the concentration of chromic acid is 0.05–02 g/l, and the concentration of ozone is 0.005–0.015 g/l.

19. A method according to claim 3 wherein the concentration of cerium nitrate is 0.5–2 g/l, the concentration of chromic acid is 0.05–02 g/l, and the concentration of ozone is 0.005–0.015 g/l.

20. A method according to claim 4 wherein the concentration of cerium nitrate is 0.5–2 g/l, the concentration of chromic acid is 0.05–0.2 g/l, and the concentration of ozone is 0.005–0.015 g/l.

21. A method according to claim 5 wherein the oxidation and dissolution are carried out at a temperature below about 25° C.

22. A method according to claim 21 wherein the temperature is below about 20° C.

23. A method according to claim 11 wherein the oxidation and dissolution are carried out at a temperature below about 25° C.

24. A method according to claim 23 wherein the temperature is below about 20° C.

25. A method according to claim 12 wherein the oxidation and dissolution are carried out at a temperature below about 25° C.

26. A method according to claim 25 wherein the temperature is below about 20° C.

27. A method according to claim 13 wherein the oxidation and dissolution are carried out at a temperature below about 25° C.

28. A method according to claim 27 wherein the temperature is below about 20° C.

29. A method according to claim 14 wherein the oxidation and dissolution are carried out at a temperature below about 25° C.

30. A method according to claim 29 wherein the temperature is below about 20° C.

* * * * *